US009064225B2

(12) United States Patent
Nakra et al.

(10) Patent No.: US 9,064,225 B2
(45) Date of Patent: Jun. 23, 2015

(54) METHOD AND APPARATUS FOR ASSET TRACKING IN CONSTRAINED ENVIRONMENTS

(71) Applicant: Petari USA, Inc., Boston, MA (US)

(72) Inventors: Jahangir Nakra, Titusville, NJ (US); Brian Lee, Boston, MA (US); Jamshed Dubash, Shrewsbury, MA (US); Mrinmoy Chakraborty, Bangalore (IN)

(73) Assignee: Senaya, Inc., Boston, MA (US)

( * ) Notice: Subject to any disclaimer, the term of this patent is extended or adjusted under 35 U.S.C. 154(b) by 100 days.

(21) Appl. No.: 13/938,628

(22) Filed: Jul. 10, 2013

(65) Prior Publication Data

US 2014/0018001 A1    Jan. 16, 2014

Related U.S. Application Data

(60) Provisional application No. 61/671,223, filed on Jul. 13, 2012.

(51) Int. Cl.
*H04B 7/00*   (2006.01)
*G06Q 10/08*  (2012.01)
*G06Q 50/28*  (2012.01)

(52) U.S. Cl.
CPC ............ *G06Q 10/0833* (2013.01); *G06Q 50/28* (2013.01)

(58) Field of Classification Search
CPC .................................................... H04W 74/002
USPC ................................................ 455/41.1, 41.2
See application file for complete search history.

(56) References Cited

U.S. PATENT DOCUMENTS

| 7,564,786 | B2 | 7/2009 | Lim et al. |
| 8,121,080 | B2 | 2/2012 | Ham et al. |
| 8,213,400 | B2 | 7/2012 | Kim et al. |
| 8,223,677 | B2* | 7/2012 | McCamon ..................... 370/311 |
| 8,908,513 | B2* | 12/2014 | Erdmann et al. ........... 370/230.1 |
| 2009/0006596 | A1 | 1/2009 | Dinakaran et al. |
| 2010/0110913 | A1 | 5/2010 | Min et al. |
| 2011/0294431 | A1 | 12/2011 | Erdmann et al. |
| 2011/0299451 | A1 | 12/2011 | Erdmann et al. |
| 2012/0063334 | A1 | 3/2012 | Drake |
| 2012/0116597 | A1 | 5/2012 | Bultman et al. |
| 2012/0150677 | A1* | 6/2012 | Shuster ........................ 705/26.1 |
| 2012/0224571 | A1 | 9/2012 | Yuan et al. |

* cited by examiner

*Primary Examiner* — Tuan H Nguyen
(74) *Attorney, Agent, or Firm* — HolzerIPLaw, PC

(57) ABSTRACT

Wireless tracking systems and devices to detect the status of cargo containers, such as aircraft cargo. The system has a transmitter device, a router, and intelligent software. The transmitter device has automatic on-off capability during use, without the need for human intervention. The transmitter device has a basic "listening state" and the router has a basic "beacon broadcast state." Only when the transmitter device is within range of the router's beacon does the device transmit data via RF signal to the router.

20 Claims, 3 Drawing Sheets

METHOD AND APPARATUS FOR ASSET TRACKING IN CONSTRAINED ENVIRONMENTS

CROSS-REFERENCE TO RELATED APPLICATION

This application claims the benefit of U.S. Provisional Application No. 61/671,223 filed Jul. 13, 2012, the entire contents of which are incorporated herein by reference for all purposes.

FIELD OF THE DISCLOSURE

The present disclosure relates generally to wireless asset tracking devices and systems.

BACKGROUND

In industry nowadays, success or failure depends in part upon knowing the up-to-date status of various assets. For example, in the freight delivery business, up-to-date knowledge of the location and, in some instances, the environment of various assets, such as pallet goods, is critical to efficient and reliable operations. Failure to maintain up-to-date status information can result in temporarily lost assets, sub-optimal use of the assets, and in the case of freight delivery, missed or late deliveries. A wireless tracking device or system is highly beneficial for solving the dilemma of knowing the physical location of the asset at a set point in time.

Federal Aviation Regulation (FAR) Sec. 91.21 restricts the use and operation of wireless communication circuitries and other portable electronic device (PED) aboard aircraft unless it has been previously determined that the specific PED will not cause interference with the navigation and communication system of the aircraft. This covers many RF generating PED, including those that transmit RF (T-PED). In additional to airport locations and on board aircraft, other secure environments restrict the use and operation of radio signals when in close proximity to those environments.

Therefore, it is a key technical challenge to devise a tracking device with automatic on-off capability during transit.

SUMMARY

This disclosure is directed to wireless tracking systems and devices to detect the status of assets, such as aircraft cargo containers. The tracking system includes at least one tracking or transmitting device, at least one router or receiver, and a software equipment such as a computer or server. The tracking or transmitter device not only includes a positioning feature to identify its location, but also provides a safeguard mechanism to prevent the tracking device from turning on in situations (e.g., locations) where radio signal communication is restricted (such as airports, in aircrafts, or proximate highly secure environments).

The presence of motion sensors and/or visions sensors in the transmitter device, in conjunction with this safeguard mechanism, increases the layers of redundancy for deactivating the device as well as adding sensory capabilities for other business intelligence gathering efforts, such as shock detection for damage detection, etc.

In some embodiments, for example when the system is configured for aircraft cargo tracking, the system uses a sensor technology to deactivate the tracking or transmitter device before aircraft take off and reactivate the devices after landing yet before taxiing, to comply with FAA regulations. The tracking system can use an array of machine vision sensors and/or inertia (motion) sensors to determine when to activate and deactivate the device. The tracking system also eliminates the need for explosive and bulky lithium-based batteries from the tracking or transmitter devices, thus enhancing the safety and operational easiness.

In one particular embodiment, this disclosure provides a method of tracking an item along a route. The method includes providing (e.g., attaching) a wireless transmitter device to the item, the device having a two-way RF communication module, and the device being in a listening mode; placing at least one router along the route, the router having a two-way RF communication module, and operably connecting the router to computer equipment having operational software thereon. The router broadcasts a beacon having a secure encrypted signature packet, the transmitter device recognizes the beacon and decodes the beacon, and if the beacon is correctly decoded, activates the transmitter device. The activated transmitter device then broadcasts a secure unique ID to the router, and the router transmits information to the computer equipment that the transmitter device was tracked.

In another particular embodiment, this disclosure provides a wireless tracking system, which includes a transmitter device, at least one router, and computer equipment. The transmitter device comprises a two-way wireless RF communication module and is configured to have a listening mode and a transmission mode. The at least one router comprises a two-way wireless RF communication module. The computer equipment has operational software thereon, and is operably connected to the at least one router, for example, by WiFi or Ethernet. The transmitter device is configured to remain in its listening mode until a beacon from the router is decoded by the transmitter device, afterwhich the transmitter device switches to its transmission mode.

These and various other features and advantages will be apparent from a reading of the following detailed description.

BRIEF DESCRIPTION OF THE DRAWING

The disclosure may be more completely understood in consideration of the following detailed description of various embodiments of the disclosure in connection with the accompanying drawing, in which.

DISCUSSION OF THE INVENTION

Figure 1:
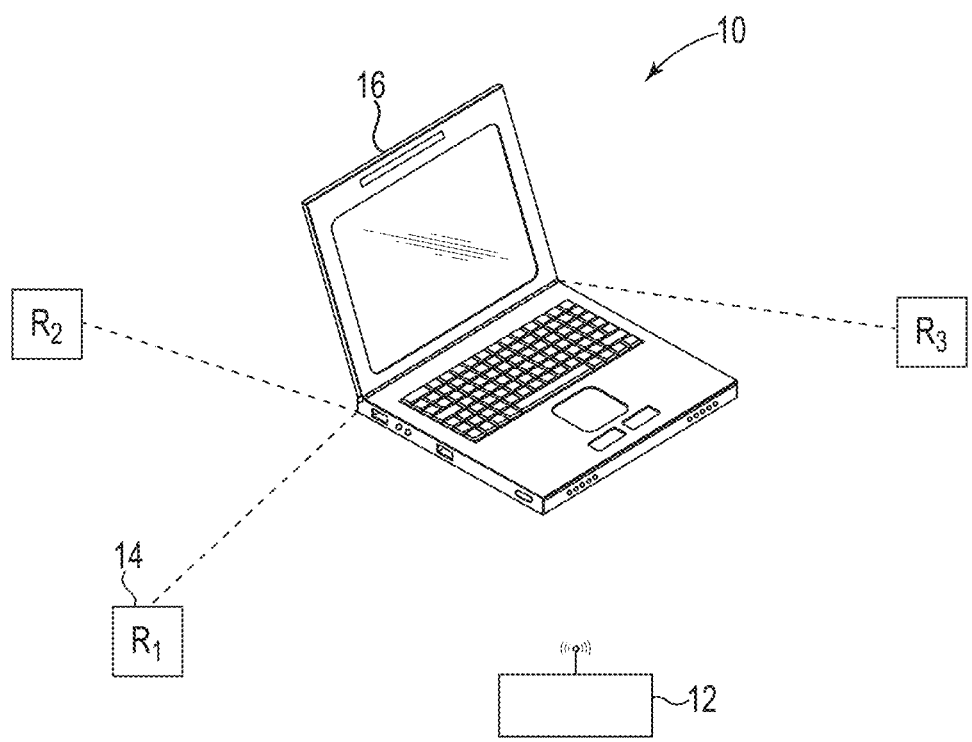
FIG. 1 is a schematic diagram of tracking system having at least one transmitting device, at least one router, and a receiver.

A wireless tracking system is highly beneficial in knowing the physical location of an asset at a set point in time. This is particularly beneficial for aircraft cargo. However, tracking systems designed for use with aircraft cargo must be specially designed to comply with FAA requirements, as no RF transmission is allowed at certain locations.

The system of this disclosure provides fault-free, automatic activation/deactivation of the transmitter device to comply with pertinent regulations (e.g., FAA, etc.) that might require the deactivation of RF transmitting devices. Because of the activation/deactivation safeguard mechanism of the system, the power requirement of the transmitter device is low, therefore a simple and safe battery (i.e., non-Li based) can be used. Additionally, the system and device provide seamless global operation without changing devices or adding additional mobile devices, and utilizes simple business logic to minimize or eliminate false negatives.

In this discussion, a "tracking device," "transmitter device," and variations thereof is a portable, signal emitting device configured for placement in or on an asset to be tracked, such as a container of goods. A "tracking system" and variations thereof includes at least one tracking or transmitter device, and a receiver for receiving the location signal from the tracking transmitter device(s).

In the following description, reference is made to the accompanying drawing that forms a part hereof and in which are shown by way of illustration at least one specific embodiment. The following description provides additional specific embodiments. It is to be understood that other embodiments are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

As will be appreciated by one of skill in the art, the invention of the present disclosure may be embodied as a method, system, computer program product, or a combination thereof. Accordingly, the invention of the present disclosure may take the form of an entirely hardware embodiment, an entirely software embodiment (including firmware, resident software, micro-code, etc.) or an embodiment combining software and hardware aspects that may generally be referred to herein as a "system."

FIG. 1 schematically illustrates a wireless tracking system, which includes at least one transmitter device, a router, and a computer, server, or other equipment having intelligent software. System 10 includes a transmitter device 12, configured for wireless communication to and from a router 14. System 10, in this illustration, includes three routers, R1, R2 and R3. Router(s) 14 are connected to equipment 16 having operational software there; this equipment 16 may be, for example, a computer, a laptop computer, a smart phone, a tablet, or a server (e.g., a software server). Equipment 16 includes a computer usable or computer readable medium that may be any medium that can contain, store, communicate, propagate, or transport the program for use by or in connection with the instruction execution system, platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline (e.g., Ethernet), optical fiber cable, radio frequency (RF), WiFi, or other means.

Router(s) 14 can be connected to equipment 16 by a ZigBee system, cellular system, WiFi, Ethernet, etc. The connection may be wireless or wired. System 10 can be operated on a global basis with the presence of a very light infrastructure deployed at each site where transmitter device 12 is expected to be seen or used. Deployment of the infrastructure is as simple as plugging in or otherwise connecting router(s) 14 to equipment 16.

System 10 has various advantages over other known tracking systems and tracking devices. Because of the avoidance of large infrastructure, the pricing of overall system and its installation is low, allowing easy mass deployment and installation. Transmitter device 12 itself is fairly low cost, due the small or no battery required for device 12. Additionally, any battery maintenance is decreased, to the longer life of any incorporated battery. Additionally transmitter device 12 is fairly low cost because it does not require cellular connectivity and thus a cellular module can be avoided. System 10 addresses situations where device 12 needs to be inactive (e.g., off, asleep, dormant), situations such as aircraft communication, where safety is paramount.

Both transmitting device 12 and router(s) 14 can be enabled for wireless RF communication, such as ZigBee. Additionally, router(s) 14 have other communication capabilities such as cellular, WiFi, Ethernet, etc. In preferred embodiments, ZigBee is the communication mechanism between device 12 and router(s) 14, and device 12 is constantly in ZigBee listening mode. At least one router(s) 14 constantly broadcasts a beacon via ZigBee with secure encrypted signature packets that only device 12 can decode and understand; if system 10 includes multiple devices 12, each device 12 can decode and understand the signature. When device 12 comes within range of a router's beacon, such as router R1 in FIG. 1, device 12 recognizes the beacon and decodes the beacon signature.

If the signature is correctly decoded, device 12 wakes up (e.g., activates) and, using secure encrypted packets, broadcasts its unique ID along with other immediate sensory information to router R1. Historical information that device 12 might have gathered in its travels, including GPS location, temperature and temperature fluctuations, humidity, etc. may also be broadcast, should device 12 be so enabled. If router R1 receives the secure information from device 12 and can decode the information, router R1 sends a specific handshake packet back to device 12 indicating successful receipt of the information. If router R1 successfully receives the device's ID and other information from device 12, router R1 appends its own ID as well as router/location specific information and then transmits all this information to the software running on equipment 16. Equipment 16 then gathers and stores the information and additionally performs business intelligence analysis. After device 12 has completed a successful transmission, it returns to its listening mode. Device 12 may remain in this listening mode for a predetermined period of time (e.g., set by the user) after which it reactivates to re-validate the beacon signature and re-transmitting the ID and sensory information.

If device 12 does not see the beacon from router R1 or cannot correctly decode the beacon signature, device 12 continues to stay in its listening, receive-only mode and does not transmit any information. Device 12 can be configured so that under no circumstances will device 12 transmit its information unless it has successfully received and decoded the beacon signature.

In some embodiments, rather than having device 12 in listening mode, device 12 may completely deactivate, not even listening for a beacon from router(s) 14. This may be done, for example, to further conserve battery lift. Motion sensor(s) may be incorporated into device 12 to trigger device 12 to switch into and out from its listening mode, depending on the motion detected. For example, if no motion has been detected in more than a predetermined time, device 12 may deactivate its listening mode, until motion is detected, at which time it will switch into is listening mode, listening for a router beacon.

As indicated, system 10 includes at least one router 14. For efficient use of system 10, router 14 is deployed at a known site where the asset needs to be tracked; any additional router(s) 14 are deployed at other known sites where the asset needs to be tracked. Depending on the communication mechanism between router(s) 14 and equipment 16, the installation of router(s) 14 may be as simple as plugging it into a power outlet. Router(s) 14 can then communicate via a cellular infrastructure to the central equipment 16. Alternately, router(s) 14 can be configured to use existing WiFi or Ethernet connectivity to communicate with equipment 16.

Figure 2:
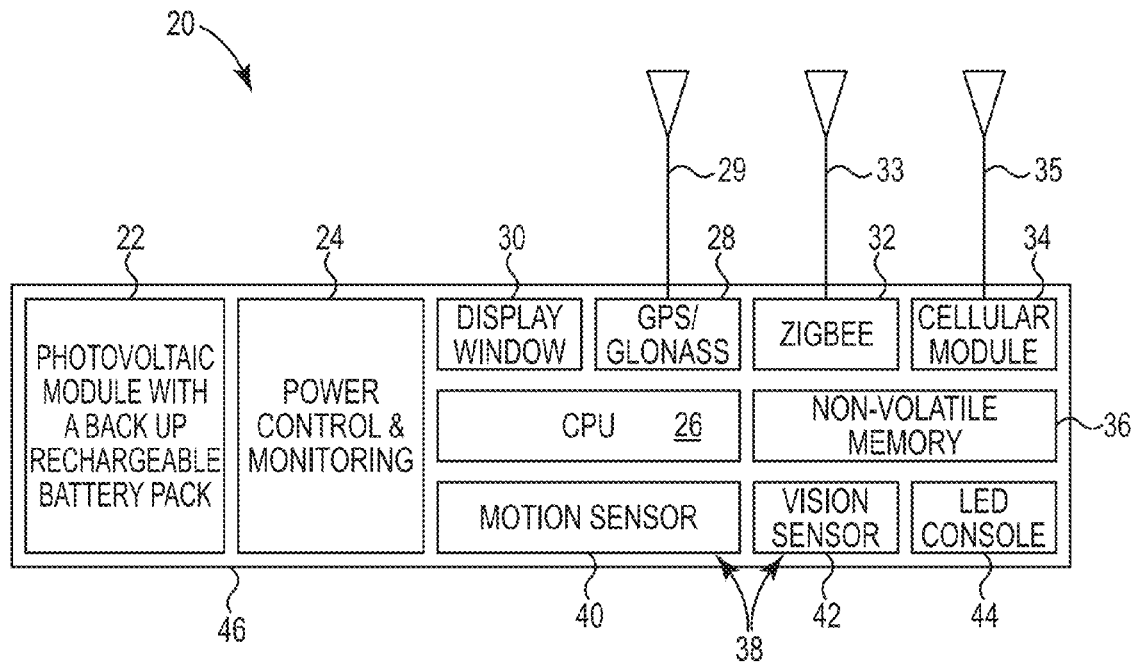
FIG. 2 is a schematic block diagram of an embodiment of a transmitting device.

FIG. 2 illustrates an embodiment of a tracking or transmitter device 20 suitable for use with system 10 of FIG. 1. This transmitter device 20 is particularly configured for use with aircraft cargo. Because aircraft, in general, have dynamic and frequent changes in their route and business environment and transmitter device 20 is configured to function throughout the aircraft's route. Transmitter device 20 can utilize established position locating technology, such as Global Positioning System (GPS), any global navigation satellite system (GNSS) such as GLONASS or Galileo, or a compass navigation system.

Transmitter device 20 relies on established, technically mature, wireless communication networks such as CDMA/GMS, ZigBee, (Low Energy) BlueTooth (LBT), WiFi (sometimes referred to as WLAN), LTE, and WiMax, and also CDMA (Code Divisional Multiple Access) and/or GSM (Global System for Mobile Communication) to relay the position of the asset being tracked to router 14.

Turning to FIG. 2, device 20 includes a power source 22, which may be a single use battery or a rechargeable battery. Examples of suitable batteries include NiCad, lithium, lithium-ion, zinc-carbon, and alkaline batteries. For example, a 3.7V battery could be used, although it is understood that other voltage batteries could be used. In FIG. 2, power source 22 includes a rechargeable battery pack and a photovoltaic module to recharge the battery pack when needed. Other power source rechargers or regenerators could be utilized, including inductive coil, a USB power-line, and mechanical energy harvesting mechanisms. In other embodiments of a transmitter device, no recharger or regenerator is utilized.

Electrically connected to power source 22 is a power module 24 that includes a battery level monitor and a power control, which in turn is operably connected to a computer chip or CPU 26. Together CPU 26 and power module 24 activate and deactivate various elements of device 20, based on the status of the aircraft in which device 20 is located. Transmitter device 20 also includes a positioning element, in this embodiment a GPS/GLONASS positioning element 28 connected to an antenna 29, which may be an internal antenna or an external antenna. Positioning element 28 provides data to transmitter device 20 regarding its physical location. Transmitter device 20 transmits information or data, such as its location, in the form of a "ping" to router 14, when activated by decoding the beacon from router 14. As described above, transmitter device 20 has two-way communication with router 14.

Device 20 is configured with a ZigBee module 32 to connect to router 14 via a ZigBee network. An alternate embodiment of a transmitter device can utilize a ZigBee/LBT module and a corresponding ZigBee/LBT network. Additionally, transmitter device 20 may include a data receiver (not shown), such as an infra red data link (IrDA), to provide a second communication means to device 20, as an alternate or back-up to module 32. An IRDA includes an optical window formed from an IR transparent material, such as glass, to allow infra red radiation or energy to pass to and from the IrDA.

Device 20 also includes a cellular communication module 34, which may be CDMA (Code Divisional Multiple Access) and/or GSM (Global System for Mobile Communication) module, configured to connect to router 14 via either a CDMA or GSM network. Modules 32, 34, respectively, have an antenna 33, 35 which may optionally include a power amplifier to extend the range of the signal from modules 32, 34. In some embodiments, modules 32, 34 may be combined into a single physical module rather than two separate or distinct modules.

Together, modules 32, 34 provide the communication basis for transmitter device 20 to router 14. Module 32, which connects device 20 a wireless RF network, is utilized when FAA regulations allow use of RF communications, and module 34, which connects device 20 to a cellular network, is utilized when FAA regulations do not allow the use of RF communications yet do allow cellular communications. Any suitable computer usable or computer readable medium may be utilized for device 20 to deactivate and activate modules 32, 34.

Any of the data or information regarding device 20, such as its position as determined by positioning element 28, alarm information, battery level information, etc., can be stored in a memory 36 of device 20, which may be a permanent memory or a rewritable memory. Data from memory 36 may be transmitted to equipment 16 or may be retained in memory 36 until manually retrieved.

Tracking device 20 includes a sensor array 38 to determine the location of device 20 in relation to an aircraft and to determine the status or mode of the aircraft, as a safeguard check whether to activate the device. Sensor array 38 includes at least one motion sensor 40 and a machine vision sensor 42. Motion sensor 40 can be, for example, a three degree of freedom (DOF) device that has a 3-axis accelerometer or can be a six degree of freedom (DOF) device that includes a 3-axis gyroscope and a 3-axis accelerometer. Other examples of suitable configurations for motion sensor 40 include a 9-DOF device that includes a 3-axis gyroscope, a 3-axis accelerometer and a 3-axis magnetometer, and a 10-DOF device that includes a 3-axis gyroscope, 3-axis accelerometer, 3-axis magnetometer, and an altitude sensor. Other embodiments of motion sensor 40 may be used. With the various multiple degrees of freedom, device 20 can distinguish among various movements, orientations and locations, such as lateral motion, acceleration, inclined or declined motion, and altitude. With this information, device 20 can determine the aircraft's status, e.g., idle, taxiing, take-off, cruising at altitude, landing, etc.

Machine vision sensor 42 applies image processing to images captured by an integral camera and calculates the characteristics of an object, such as its area, center of gravity, length, or position, and outputs the data or judgment results. Examples of the objects vision sensor 42 can detect, when incorporated into tracking device 20, include an aircraft door, movement of a conveyer belt, sunlight entering through the aircraft door, and curvature of the cargo hold. Vision sensor 42 is selected to have a high dynamic range (HDR>120 dB), high frame rate (at least FRS>100 frame per second, in some embodiments FRS>120 or even >140), a global shutter (to minimize smearing and distortion of images), and preferably, a low cost CMOS Image Sensor to capture the entrance and exiting event of a tagged container from an airplane door. Vision sensor 42 can be configured with UV protected lenses with IR (Infra-Red) sensing capability for night vision detection. Vision sensor 42 may be equipped with an auto-focus and anti-shaking frame. A normally closed mechanical on/off shutter may be included to avoid direct exposure of sensor 42 to sunlight when not in use.

Utilizing motion sensor 40 and/or vision sensor 42 will decrease the occurrence of false positive beacon signals from router 14. For example, machine vision sensor 42 can confirm whether or not device 20 is in a cargo hold, by evaluating, for example, the cargo hold curvature, the shape of the door, or sunlight entering through the door to the hold. If confirmed that in a cargo hold, any beacon that device 20 might detect can immediately treated as an improper or undecodable beacon.

Device 20 may also include an indicator console 44 having various operational switches, gauges, buttons, and/or lights (e.g., LED lights). Console 44 may include any number of optional features, such as an audio alarm to indicate any number of problems or malfunctions, such as low battery level, unauthorized movement (as sensed by motion sensor 40), or tampering with device 20. Device 20 may include a temperature gauge.

The various elements that compose transmitter device 20 may be housed in an RF and/or cellular transmissive case 46, preferably one that is at least water resistant. Case 46 may be, or may include, a protective window transparent to visible and IR light.

Figure 3:
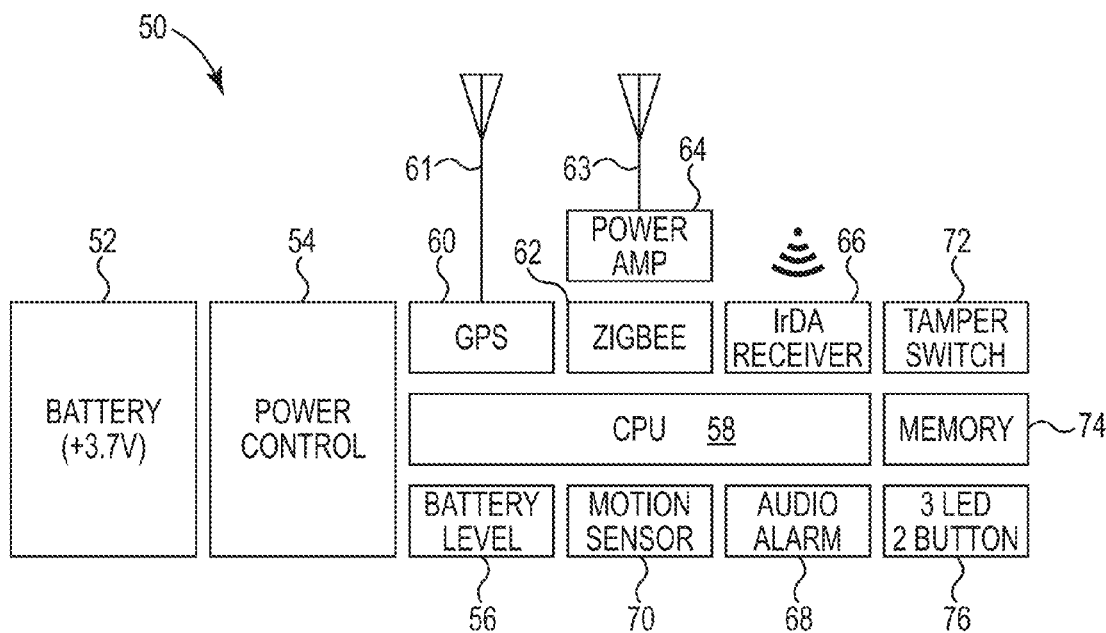
FIG. 3 is a schematic block diagram of another embodiment of a transmitting device.

FIG. 3 illustrates another embodiment of a tracking or transmitter device 50 suitable for use with system 10 of FIG. 1. Similar to transmitter device 20, device 50 relies on established, technically mature, wireless communication networks such as CDMA/GMS, ZigBee, (Low Energy) BlueTooth (LBT), WiFi (sometimes referred to as WLAN), LTE, and WiMax, and also CDMA (Code Divisional Multiple Access) and/or GSM (Global System for Mobile Communication) to relay the position of the asset being tracked to router 14.

Turning to FIG. 3, transmitter device 50 includes a battery 52, which may be a single use battery or a rechargeable battery. Examples of suitable batteries include NiCad, lithium, lithium-ion, zinc-carbon, and alkaline batteries. In the figures, battery 52 is identified as a 3.7V battery, although it is understood that other voltage batteries 52 could be used. Electrically connected to battery 52 is a battery level monitor 56 and a power control 54, which in turn is operably connected to a computer chip or CPU 58. Transmitter device 50 also includes a positioning element, in these embodiments a GPS positioning element 60 connected to an antenna 61, which may be an internal antenna or an external antenna. Positioning element 60 provides data to transmitter device 50 regarding its physical location, which is then transmitted to router 14.

Device 50 includes a ZigBee module 62, configured to connect device 50 to router 14 via a ZigBee network and communicate data to router 14. Module 62 has an antenna 63, which may optionally include a power amplifier 64 to extend the range of the signal from module 62. Transmitter device 50 is configured for two-way communication with router 14. That is, transmitter device 50 transmits information to and also receives information from router 14.

Additionally, transmitter device 50 may include a data receiver 66, such as an infra red data link (IrDA), to provide a second communication means to router 14, as an alternate or back-up to module 62. IrDA 66 includes an optical window formed from an IR transparent material, such as glass, to allow infra red radiation or energy to pass to and from IrDA 66. An audio alarm 68 may be included, to indicate any number of problems or malfunctions, such as low battery level, unauthorized movement (as sensed by motion sensor 70), or tampering with device 50 (as sensed by switch 72).

Any of the data or information regarding device 50, such as it's position as determined by positioning element 60, alarm information, battery level information, and ping information, etc., can be stored in memory 74 of device 50, which may be a permanent memory or a rewritable memory. Device 50 may also include various operational switches and buttons 76, in these embodiments, 3 LED lights and 2 button. The various elements that compose transmitter device 50 may be housed in an RF transmissive case, preferably one which is at least water resistant.

Device 50 may be configured to optimize the value per data ping by sending a transmission when needed and not during times of inactivity (for example, when no movement has occurred for a predetermined period, even if a router beacon is detected). For example, U.S. patent applications having Ser. Nos. 13/796,574 and 13/796,683, both filed Mar. 12, 2013, and U.S. patent application having Ser. No. 13/845,802 filed Mar. 18, 2013, all assigned to Petari USA, Inc. and all incorporated herein by reference, base the ping transmission on a predetermined event (e.g., a business critical event) and/or on detection of a predetermined movement or pattern of movement.

The effectiveness of tracking system 10 to track and/or locate an asset (on which is located transmitter device 12) is directly impacted by the life of the power source (i.e., battery) that provides transmitter device 12 (e.g., transmitter device 20 or 50) with the energy to perform its function, which includes sending its 'ping'. The expectation with these tracking systems 10 is to have autonomous operation for extended periods of time, such as weeks, months and sometimes even years. An active RF tag or transmitter device is one which actively transmits its location or other data at a predetermined point in time to a receiver. Although each data transmission or ping from the transmitter device uses very little power from the self-contained battery, over extended periods of time, such as months weeks, and sometimes as quickly as days, the battery is drained of power, resulting in a poorly functioning or non-functioning transmitter which could result in a lost tagged asset. To reduce the opportunity of a poorly functioning or non-functioning transmitter, the transmitter undergoes battery maintenance or replacement, which increases operational expenses.

System 10 of the present disclosure greatly reduces the operational expenses by having the transmitter device 12 in a deactivated (sleep) mode until activated (woken) by a properly decoded beacon signal from a router 14.

Figures 4, 5:
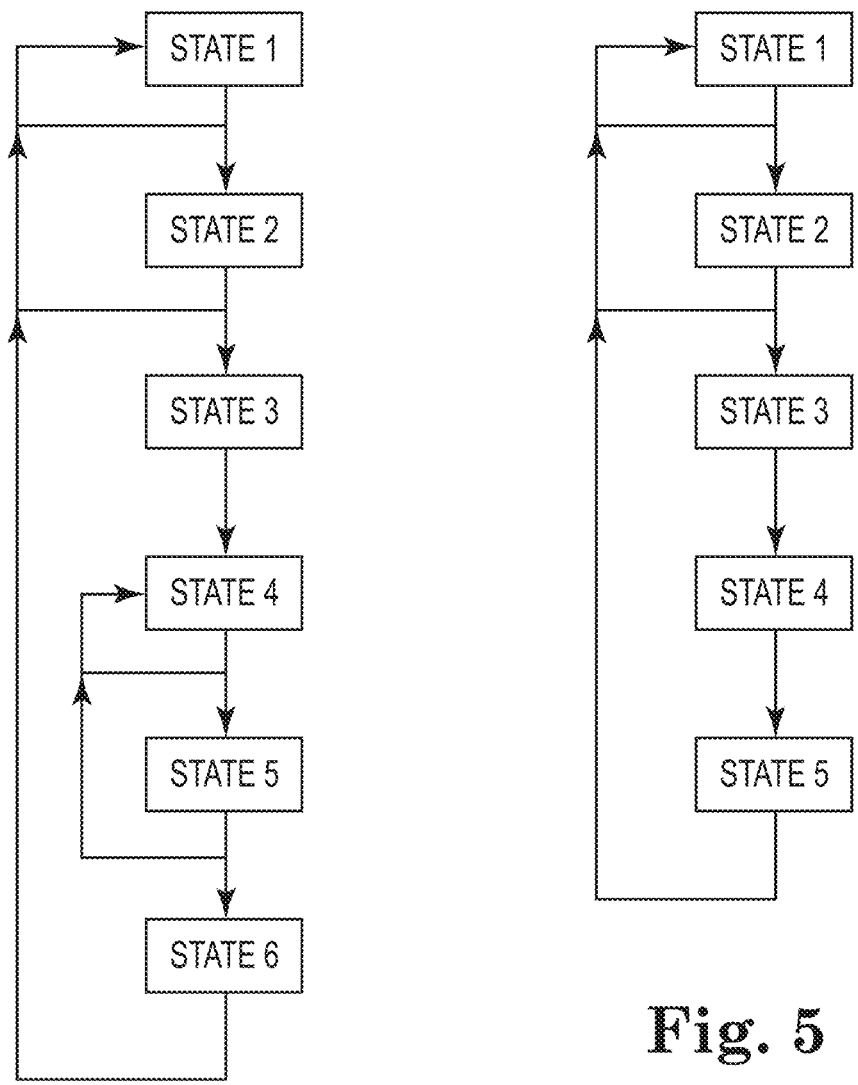
FIG. 4 is a block diagram flow chart of an operational protocol for a transmitting device of the system of FIG. 1.
FIG. 5 is a block diagram flow chart of an operational protocol for a router of the system of FIG. 1.

FIGS. 4 and 5 illustrate two possible operational protocols for transmitter device 12 and router 14, respectively, of system 10.

In FIG. 4, device 12 begins in STATE 1, a semi-active listening mode. When device 12 receives and/or detects a beacon (e.g., ZigBee) signal from router 14, it progresses to STATE 2. In STATE 2, device 12 captures the beacon signature, if possible. Device 12 traps the beacon signal packet, decodes the packet, validates the packet, and if the signature is validated, progresses to STATE 3. If the signature is not validated or if any of the other steps are not completed, device 12 returns to STATE 1. At STATE 3, device 12 broadcasts its ID and gathered information (e.g., location) to router 14, after which device 12 progresses to STATE 4. In STATE 4, device 12 waits for acknowledgement from router 14. If an acknowledgement packet is received, device 12 progresses to STATE 5. If no acknowledgement packet is received, device remains in STATE 4. In STATE 5, device 12 decodes the acknowledgement packet. If successfully decoded, and if the acknowledge packet is confirmed as intended for device 12 (and not some other device), device 12 progresses to STATE 6. Otherwise, device 12 returns to STATE 4, until an acknowledgement packet is successfully received. Device 12 remains in STATE 6 for a predetermined period of time, after which it returns to STATE 1, listening for a beacon.

In FIG. 5, router 14 begins in STATE 1. It alternately broadcasts a beacon and then enters a listening mode. In some embodiments, router 14 may continuously be in a listening mode, that is, broadcasting while in the listening mode. When router 14 receives or detects a response from a device 12, indicating that a device 12 is proximate, router progresses to STATE 2. In STATE 2, router 14 captures and validates the data packet sent by device 12. Router 14 traps the package, decodes the packet, and validates the packet. If the signature and the data are validated, router 14 progresses to STATE 3. If either the signature or the data are not validated, router 14 returns to STATE 1. In STATE 3, router 14 stops transmitting the beacon (if not previously stopped) and sends an acknowledgement packet back to device 12 that the signature and data were validated. Router 14 then progresses to STATE 4. In STATE 4, router 14 transmits a second beacon to device 12 and appends/updates the information originally received from device 12, after which router 14 progresses to STATE 5. In some embodiments, router 14 may progress directly from STATE 3 to STATE 5, without transmitting a second beacon and appending its information. In STATE 5, router 14 transmits the information/data received from device 12 to equipment 16, and returns to STATE 1.

It is understood that numerous variations of a tracking system and transmitting device have been discussed above and could be made while maintaining the overall inventive design of that disclosed above and remaining within the scope of the invention. Numerous alternate design or element features have been mentioned. One skilled in the art will appreciate that the present invention can be practiced with embodiments other than those disclosed. The disclosed embodiments are presented for purposes of illustration and not limitation. At least the following embodiments have been disclosed:

1. An RF-based asset tracking system, particularly suitable for aircraft cargo containers, the system including
   a. a transmitter device,
   b. a router, and
   c. preferably, software on equipment such as a server.
2. A transmitter device and its operating method, the device having
   a. an RF-based (e.g., ZigBee) communication platform, and
   b. configured for secure encrypted packet data exchange for control of transmissions.
3. A transmitter device that has a sensor capability including any or all of:
   a. accelerometer(s)
   b. gyroscope(s)
   c. humidity sensor(s)
   d. temperature sensor(s)
   e. other sensor(s)
4. A router and its operating method, the router having
   a. an RF-based (e.g., ZigBee) communication platform, and
   b. long haul communication capability, being any or all of:
      i. Cellular
      ii. WiFi
      iii. Ethernet
5. A tracking system that appends router specific information to receive encoded information and re-transmittal to centralized computer equipment (e.g., software server)
6. A tracking system that includes detection of proximity of a transmitter device to a router by entailing the detection of an encrypted signature broadcast by the router via a ZigBee beacon.
7. A tracking system that includes wake up and handshaking of devices (a transmitter device and a router) via ZigBee infrastructure for secure communication
8. A tracking system that includes a combination of proximity sensing and motion sensing configurations to detect business critical events and control or augment a device or a system Thus, various embodiments of the METHOD AND APPARATUS FOR ASSET TRACKING IN CONSTRAINED ENVIRONMENTS are disclosed. The implementations described above and other implementations are within the scope of the following claims. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A method of tracking an item along a route, comprising: providing a wireless transmitter device to the item, the wireless transmitter device having a two-way RF communication module, and the wireless transmitter device being in a listening mode; placing at least one router along the route, the router having a two-way RF communication module, and operably connecting the router to computer equipment having operational software thereon; the router broadcasting a beacon having a secure encrypted signature packet; the wireless transmitter device recognizing the beacon and decoding the beacon, and only if the beacon is correctly decoded, activating the wireless transmitter device; the activated wireless transmitter device receiving a data package from the router and broadcasting a secure unique ID and its location to the router; and the router transmitting information to the computer equipment that the wireless transmitter device was tracked.

2. The method of claim 1 wherein the two-way communication modules are ZigBee modules.

3. The method of claim 1 wherein the router is operably connected to the computer equipment by WiFi or Ethernet.

4. The method of claim 1 further comprising the router decoding the secure unique ID from the activated wireless transmitter device, and if the ID is correctly decoded, the router sending a handshake package to the transmitter device.

5. The method of claim 4 further comprising, after the router sending the handshake package to the transmitter device, the router appending its own ID as well as location information.

6. A wireless tracking system comprising: a transmitter device comprising a two-way wireless RF communication module and having a listening mode and a transmission mode; at least one router comprising a two-way wireless RF communication module; and computer equipment having operational software thereon, the computer equipment operably connected to the at least one router; the transmitter device configured to remain in its listening mode until a beacon from the router is decoded by the transmitter device, only afterwhich the transmitter device switches to its transmission mode to receive a data package from the router and broadcast a location data package to the router.

7. The tracking system of claim 6 wherein each of the RF communication modules is a ZigBee communication module.

8. The tracking system of claim 6, the transmitter device further comprising a CDMA and/or GSM cellular communication module.

9. The tracking system of claim 6 wherein the transmitter device further comprises a battery.

10. The tracking system of claim 9 wherein the battery is a rechargeable battery.

11. The tracking system of claim 10 further comprising a battery recharging mechanism.

12. The tracking system of claim 6 wherein the transmitter device further comprises a sensor array, and wherein the RF communication module of the transmitter device is configured to deactivate and activate based on movement detected by the sensor array.

13. The tracking system of claim 12 wherein the sensor array comprises a machine vision sensor with a high dynamic range (HDR>120 dB), a high frame rate, a global shutter, and low cost image sensor.

14. The tracking system of claim 12 wherein the sensory array comprises a motion sensor having ten degrees of freedom.

15. A method of locating an item, comprising: providing a wireless transmitter device operably connected to the item, the wireless transmitter device having a two-way RF communication module, a listening mode and a broadcasting mode, and the wireless transmitter device being in a listening mode; providing at least one router having a two-way RF communication module, a listening mode and a broadcasting mode, the router operably connected to computer equipment having operational software thereon; the router broadcasting a secure encrypted signature packet; the wireless transmitter device receiving and decoding the secure encrypted signature packet, and only after decoding the secure encrypted signature packet receiving a data package from the router and broadcasting a data package to the router; and the router transmitting information to the computer equipment that the wireless transmitter device was located.

16. The method of claim 15 wherein the two-way communication modules are ZigBee modules.

17. The method of claim 16, wherein the wireless transmitter device further comprises a CDMA and/or GSM cellular communication module.

18. The method of claim 15 wherein the router is operably connected to the computer equipment by WiFi or Ethernet.

19. The method of claim 15 wherein the wireless transmitter device comprises a rechargeable battery.

20. The method of claim 19 wherein the wireless transmitter device further comprises a battery recharging mechanism.

* * * * *